J. FROSIG & L. W. WALSTROM.
VEHICLE SPRING.
APPLICATION FILED APR. 21, 1914.

1,125,505.

Patented Jan. 19, 1915.

Witnesses.
Edwin J Beller.
N. W. Primm.

Inventors.
Jeff Frosig &
L. W. Walstrom.

By Jas. E. Dodge.
Attorney.

UNITED STATES PATENT OFFICE.

JEFF FROSIG AND LEE W. WALSTROM, OF RENO, NEVADA.

VEHICLE-SPRING.

1,125,505.　　　　Specification of Letters Patent.　　Patented Jan. 19, 1915.

Application filed April 21, 1914.　Serial No. 833,527.

*To all whom it may concern:*

Be it known that we, JEFF FROSIG and LEE W. WALSTROM, citizens of the United States, residing at Reno, in the county of Washoe and State of Nevada, have invented certain new and useful Improvements in Vehicle-Springs; and we hereby declare the following to be a full, clear, and exact description of the invention, such as will enable others skilled in the art to which it appertains to make and use the same.

Our invention relates to improvements in vehicle springs, and particularly to improvements in springs for automobiles.

The object of our invention is to provide means whereby a limited amount of angular displacement between a vehicle body and its running gear may take place, this movement being cushioned, that is to say, opposed by a resilient force, while at the same time the same cushioning means will also serve to reinforce the leaf springs, not suddenly, but gradually and increasingly.

This invention is to be considered an improvement upon our Patent 1,076,414, granted October 21, 1913.

With the above, and other objects in view, the invention consists in certain details of construction and combinations of parts, more fully hereinafter described, and particularly pointed out in the appended claims.

Figure 1:
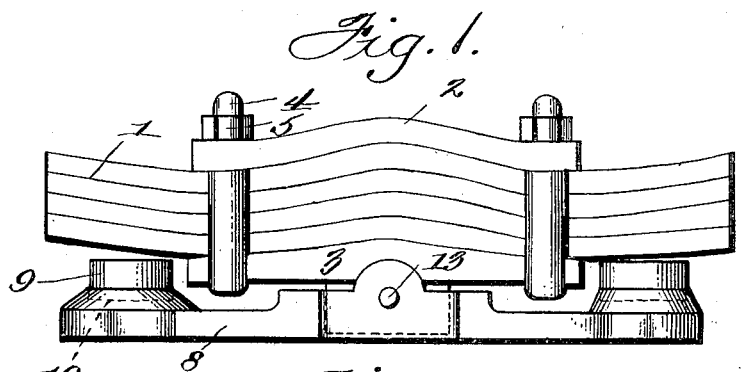
Figure 2:
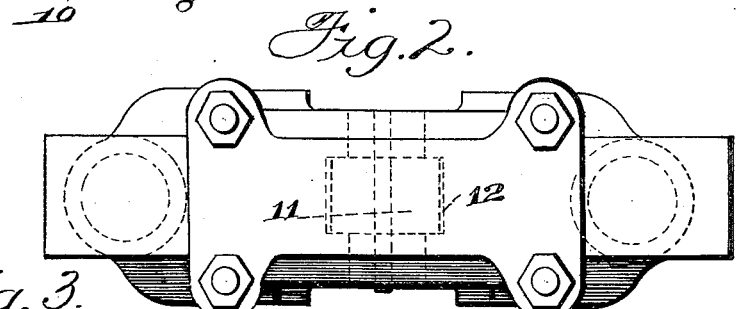
Figure 3:
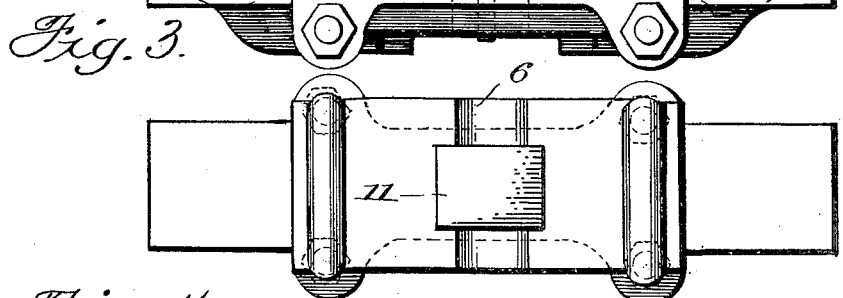
Figure 4:
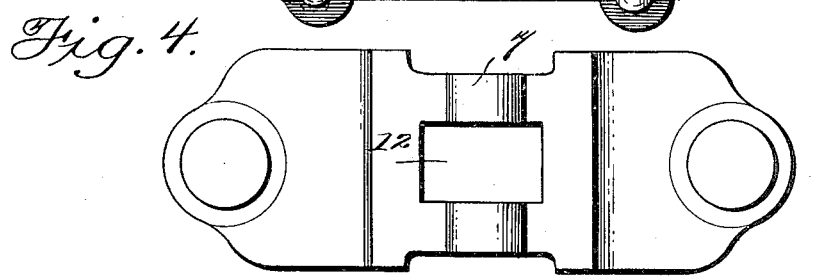

Considering the invention in connection with the accompanying drawing forming part of this application; Figure 1 represents a side elevational view of our invention; Fig. 2 a top plan view thereof; Fig. 3, a bottom plan view with the hinge plate removed; Fig. 4, a top plan view of the hinge plate; and Fig. 5, a side elevational view of the hinge plate illustrating a modification.

Referring more particularly to the drawings, the numeral 1 represents a composite spring of the usual form comprising a plurality of concaved leaf springs. The top bearing or spring plate 2 is clipped onto the spring and bottom plate 3 by means of a yoke 4 connecting the clip bolts 5 on the top, instead of being a solid band shrunk on as shown in our prior patent above mentioned. The bottom plate 3 is grooved at 6 to rest on a globe bearing 7 on the hinge plate 8, thereby preventing side movement. A rubber bumper 9 rests in a socket 10 at either end of the hinge plate 8. The block 11 rests within the slot 12 and is held in position by means of the pintle 13.

Figure 5:
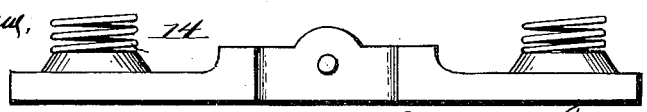

Fig. 5 illustrates a modification view, the use of coil springs in place of rubber bumpers 14.

It is obvious that those skilled in this art may vary the details of construction and combination of parts without departing from the spirit of our invention, and therefore,

What we claim as new and desire to secure by Letters-Patent, is:—

1. In a vehicle spring, the combination with a curved top plate, a substantially horizontal bottom plate, a yoke fastening said top plate to said bottom plate, a leaf spring extending through and held by said yoke, a hinge plate secured to said bottom plate and having sockets at each end and blocks of rubber positioned in said sockets.

2. In a vehicle spring, the combination with a curved top plate, a substantially horizontal bottom plate, a yoke fastening said top plate to said bottom plate, a leaf spring extending through and held by said yoke, a hinge plate secured to said bottom plate and having sockets at each end and coil springs located within said sockets.

3. In a spring construction, a hinge plate having a central opening and upstanding rounded projections on the opposite sides of said opening, buffers on the ends of said plate, a second plate having a central block disposed in said opening, and pivotally secured to said first plate; the sides of said opening bearing against the block to prevent lateral displacement and the second plate having concaved portions to receive the rounded projections of the first plate, a composite leaf spring disposed on the second plate, and clips securing said leaf spring to the second plate, said spring being adapted to bear on the buffers.

In testimony whereof, we affix our signatures, in presence of two witnesses.

JEFF FROSIG.
LEE W. WALSTROM.

Witnesses:
E. R. DODGE,
B. E. DONLIN.

Copies of this patent may be obtained for five cents each, by addressing the "Commissioner of Patents, Washington, D. C."